US010915303B2

(12) United States Patent
Back et al.

(10) Patent No.: US 10,915,303 B2
(45) Date of Patent: Feb. 9, 2021

(54) RUN TIME INTEGRATED DEVELOPMENT AND MODIFICATION SYSTEM

(71) Applicant: SAP SE, Walldorf (DE)

(72) Inventors: Tim Back, Mannheim (DE); Holger Bohle, Dielheim (DE); Stefan Engelhardt, Bad Schönborn (DE); Thorsten Erlewein, Karlsruhe (DE); Ioannis Grammatikakis, Maxdorf (DE); Ralf Handl, Heidelberg (DE); Bernhard Siewert, Hockenheim (DE); Gregor Tielsch, Mannheim (DE); Marcel Waechter, Graben-Neudorf (DE); Martin Zurmuehl, Mühlhausen (DE); Christoph Gollmick, Heidelberg (DE)

(73) Assignee: SAP SE, Walldorf (DE)

(*) Notice: Subject to any disclaimer, the term of this patent is extended or adjusted under 35 U.S.C. 154(b) by 231 days.

(21) Appl. No.: 15/416,771

(22) Filed: Jan. 26, 2017

(65) Prior Publication Data
US 2018/0210622 A1    Jul. 26, 2018

(51) Int. Cl.
*G06F 8/38* (2018.01)
*G06F 8/34* (2018.01)
*G06F 8/65* (2018.01)

(52) U.S. Cl.
CPC .............. *G06F 8/38* (2013.01); *G06F 8/34* (2013.01); *G06F 8/65* (2013.01)

(58) Field of Classification Search
CPC ............. G06F 21/629; G06F 8/38; G06F 8/65
See application file for complete search history.

(56) References Cited

U.S. PATENT DOCUMENTS

| 5,517,663 | A  | 5/1996  | Kahn       |
|-----------|----|---------|------------|
| 5,657,462 | A  | 8/1997  | Brouwer    |
| 5,682,469 | A  | 10/1997 | Linnett    |
| 5,727,950 | A  | 3/1998  | Cook       |
| 5,754,174 | A  | 5/1998  | Carpenter  |
| 5,877,759 | A  | 3/1999  | Bauer      |
| 6,025,841 | A  | 2/2000  | Finkelstein|
| 6,085,184 | A  | 7/2000  | Bertrand   |
| 6,262,730 | B1 | 7/2001  | Horvitz    |
| 6,735,632 | B1 | 5/2004  | Kiraly     |
| 6,751,606 | B1 | 6/2004  | Fries      |
| 6,788,313 | B1 | 9/2004  | Heil       |

(Continued)

OTHER PUBLICATIONS

EP Extended European Search Report for European Appln. No. 17000813.0, dated Aug. 23, 2017, 7 pages.

(Continued)

*Primary Examiner* — Alvin H Tan
(74) *Attorney, Agent, or Firm* — Sterne, Kessler, Goldstein & Fox P.L.L.C.

(57) ABSTRACT

Disclosed herein are system, method, and computer program product embodiments for an integrated development and modification system. An embodiment operates by providing an application including a user interface component bound to perform a function on data from a data source. A modification of the user interface component is received during a run time of the application. The modification is applied to the application. The application including the modification is provided to the user during the run time of the application.

20 Claims, 5 Drawing Sheets

(56) References Cited

U.S. PATENT DOCUMENTS

| | | | |
|---|---|---|---|
| 6,845,486 B2 | 1/2005 | Yamada | |
| 6,892,349 B2 | 5/2005 | Shizuka | |
| 7,441,190 B2 | 10/2008 | Asami | |
| 7,603,375 B2 | 10/2009 | Ng | |
| 7,636,045 B2 | 12/2009 | Sugiyama | |
| 7,797,146 B2 | 9/2010 | Harless | |
| 7,797,338 B2 | 9/2010 | Feng | |
| 7,933,399 B2 | 4/2011 | Knott | |
| 7,966,269 B2 | 6/2011 | Bauer | |
| 8,225,231 B2 | 7/2012 | Zielinski | |
| 8,892,585 B2 * | 11/2014 | El Husseini | G06Q 10/10 707/758 |
| 8,978,010 B1 | 3/2015 | Thumfart et al. | |
| 9,176,801 B2 | 11/2015 | Baeuerle et al. | |
| 9,202,171 B2 | 12/2015 | Kuhn | |
| 9,223,549 B1 | 12/2015 | Hermanns et al. | |
| 9,298,681 B2 * | 3/2016 | Ahmed | G06F 17/2288 |
| 9,507,609 B2 * | 11/2016 | Glazer | G06F 9/452 |
| 9,703,458 B2 | 7/2017 | Sasaki | |
| 9,740,462 B2 | 8/2017 | Rao et al. | |
| 9,807,145 B2 | 10/2017 | Koon | |
| 10,210,000 B2 * | 2/2019 | Valtchev | G06F 9/542 |
| 10,460,015 B1 * | 10/2019 | Totale | G06F 16/958 |
| 2002/0005865 A1 | 1/2002 | Hayes-Roth | |
| 2002/0149611 A1 | 10/2002 | May | |
| 2003/0020671 A1 | 1/2003 | Santoro | |
| 2003/0028498 A1 | 2/2003 | Hayes-Roth | |
| 2004/0056878 A1 | 3/2004 | Lau | |
| 2004/0075677 A1 | 4/2004 | Loyall | |
| 2004/0083453 A1 * | 4/2004 | Knight | G06F 11/323 717/113 |
| 2004/0179659 A1 | 9/2004 | Byrne | |
| 2005/0039127 A1 | 2/2005 | Davis | |
| 2006/0041848 A1 | 2/2006 | Lira | |
| 2006/0136223 A1 | 6/2006 | Brun | |
| 2006/0253791 A1 | 11/2006 | Kuiken | |
| 2006/0271398 A1 | 11/2006 | Belcastro | |
| 2007/0083821 A1 | 4/2007 | Garbow | |
| 2007/0226241 A1 | 9/2007 | Ng | |
| 2007/0260737 A1 * | 11/2007 | Gomes | G06F 9/451 709/229 |
| 2008/0096533 A1 | 4/2008 | Manfredi | |
| 2008/0155409 A1 | 6/2008 | Santana | |
| 2009/0153335 A1 | 6/2009 | Birtcher | |
| 2009/0248695 A1 | 10/2009 | Ozzie | |
| 2010/0199195 A1 | 8/2010 | Carounanidy | |
| 2011/0283215 A1 | 11/2011 | Dunn | |
| 2012/0216125 A1 | 8/2012 | Pierce | |
| 2012/0253788 A1 | 10/2012 | Heck | |
| 2012/0254227 A1 | 10/2012 | Heck | |
| 2012/0265528 A1 | 10/2012 | Gruber | |
| 2013/0152017 A1 | 6/2013 | Song | |
| 2013/0174034 A1 | 7/2013 | Brown | |
| 2013/0204813 A1 | 8/2013 | Master | |
| 2013/0219307 A1 * | 8/2013 | Raber | G06F 3/0484 715/763 |
| 2014/0040748 A1 | 2/2014 | Lemay | |
| 2014/0068459 A1 | 3/2014 | Graham | |
| 2014/0074483 A1 | 3/2014 | Van Os | |
| 2014/0337770 A1 | 11/2014 | Sasaki et al. | |
| 2014/0344024 A1 | 11/2014 | Kempf | |
| 2015/0006135 A1 | 1/2015 | Deb et al. | |
| 2015/0040104 A1 | 2/2015 | Mall | |
| 2015/0074069 A1 | 3/2015 | Baeuerle et al. | |
| 2015/0089373 A1 | 3/2015 | Dwivedi et al. | |
| 2015/0089403 A1 | 3/2015 | Zhu et al. | |
| 2015/0123993 A1 | 5/2015 | Ohba | |
| 2015/0161180 A1 | 6/2015 | Hermanns et al. | |
| 2015/0186156 A1 | 7/2015 | Brown | |
| 2015/0195406 A1 | 7/2015 | Dwyer | |
| 2015/0339036 A1 | 11/2015 | Hwang | |
| 2015/0382047 A1 | 12/2015 | VanOs | |
| 2016/0062745 A1 | 3/2016 | Rao | |
| 2016/0070580 A1 | 3/2016 | Johnson | |
| 2016/0092176 A1 * | 3/2016 | Straub | G06F 3/0486 717/107 |
| 2016/0094497 A1 | 3/2016 | Javed | |
| 2016/0378326 A1 | 12/2016 | Svinth | |
| 2017/0177650 A1 | 6/2017 | Devine et al. | |
| 2017/0329466 A1 | 11/2017 | Krenkler et al. | |
| 2017/0329468 A1 | 11/2017 | Schon et al. | |
| 2017/0329479 A1 | 11/2017 | Rauschenbach et al. | |
| 2017/0329483 A1 | 11/2017 | Jann et al. | |
| 2017/0329499 A1 | 11/2017 | Rauschenbach et al. | |
| 2017/0329500 A1 | 11/2017 | Grammaikakis et al. | |
| 2017/0329505 A1 | 11/2017 | Richter et al. | |
| 2017/0329580 A1 | 11/2017 | Brat et al. | |
| 2017/0329581 A1 | 11/2017 | Jam et al. | |
| 2017/0329614 A1 | 11/2017 | Schon et al. | |
| 2017/0331915 A1 | 11/2017 | Jam et al. | |
| 2017/0344218 A1 | 11/2017 | Jann et al. | |
| 2017/0346949 A1 | 11/2017 | Sanghavi | |

OTHER PUBLICATIONS

"SAP Blog Part 1", Ferriera, S. (May 9, 2016), How to create smart Templates annotations within CDS views—Part 1. [Retrieved May 3, 2019] https://blogs.sap.com/2016/05/09/how-to-create-smart-templates-annotations-withincds-views-part-1/ (17 pages).

"SAP Blog Part 2", Ferriera, S. (May 9, 2016), How to create smart Templates annotations within CDS views—Part 2, [Retrieved May 3, 2019] https://blogs.sap.com/2016/05/09/how-to-create-smart-templates-annotations-withincds-views-part-2/ (17 pages).

"SAP Blog Part 3", Ferriera, S. (May 9, 2016), How to create smart Templates annotations within CDS views—Part 3. [Retrieved May 3, 2019] https://blogs.sap.com/2016/05/09/how-to-create-smart-templates-annotations-within-cds-views-part-3/ (25 pages).

U.S. Non-Final Office Action in U.S. Appl. No. 15/390,262, dated Nov. 30, 2018, 18 pages.

U.S. Non-Final Office Action in U.S. Appl. No. 15/461,290, dated Jun. 22, 2018, 9 pages.

U.S. Non-Final Office Action in U.S. Appl. No. 15/461,296, dated Dec. 11, 2018, 24 pages.

U.S. Non-Final Office Action in U.S. Appl. No. 15/461,313, dated Apr. 5, 2018, 10 pages.

U.S. Non-Final Office Action in U.S. Appl. No. 15/461,330, dated Aug. 10, 2018, 14 pages.

U.S. Non-Final Office Action in U.S. Appl. No. 15/462,072, dated Jan. 9, 2019, 21 pages.

U.S. Non-Final Office Action in U.S. Appl. No. 15/591,989, dated Nov. 14, 2018, 15 pages.

* cited by examiner

RUN TIME INTEGRATED DEVELOPMENT AND MODIFICATION SYSTEM

BACKGROUND

Application developers are focused on developing applications that provide functionality relevant to users of an application. However, when building an application from scratch, there is a tremendous amount of programming involved, and the same function can often be programmed in multiple different ways. Not only might this process waste time and distract an application developer from the central purpose of building the application, but it may also introduce a greater likelihood of errors and inconsistencies across applications. Furthermore, any time a user needs a change to the application, the user often must first contact the application developer, who may become the bottleneck for application improvements especially as the number of users or changes grows.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing an integrated development and modification system.

Figure 1:
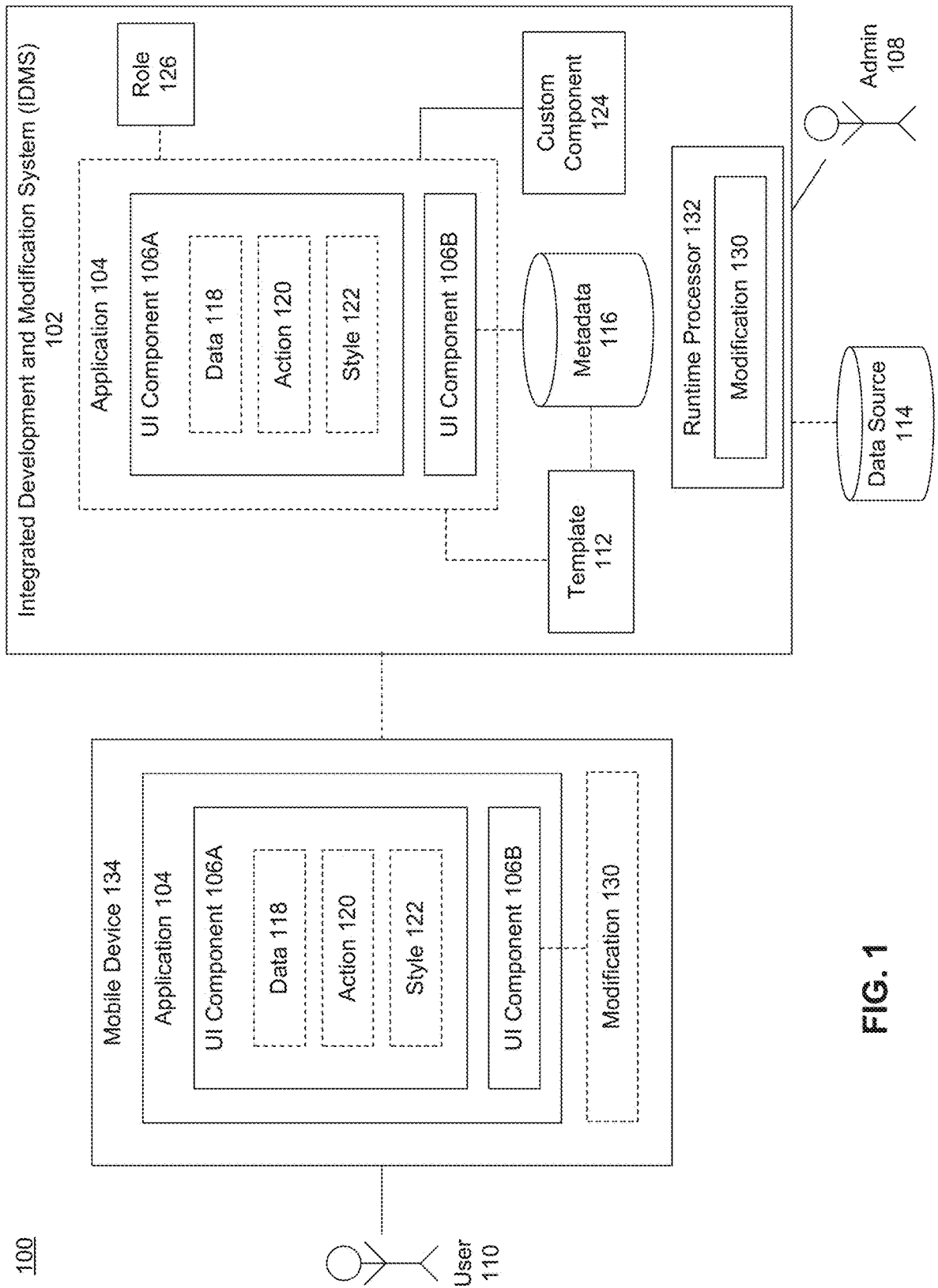
FIG. 1 is a block diagram of an integrated development and modification system (IDMS), according to some embodiments.

FIG. 1 is a block diagram 100 of an integrated development and modification system (IDMS) 102, according to some embodiments. IDMS 102 allows for the development and modification of an application 104 in at least two different modes of operation: design time and run time. During the design time mode, an application developer or administrator 108 may create the shell or skeleton of application 104 and fill in the shell with user interface components 106 and functionality to be performed or executed by the application 104. During the run time mode, a user 110 (such as an end user or key user) may modify certain features or aspects of the application 104 during an execution, operation, or use of application 104.

Admin 108 may be an application developer, programmer, or other administrator of a system who has the authorization, role, or responsibility of creating or modifying applications 104 for use by one or more users 110, or any combination thereof. IDMS 102 may enable admin 108 to create a new application using a template 112.

Template 112 may be a pre-configured shell or skeleton of an application 104. In an embodiment, template 112 may be a digital canvas upon which admin 108 may drag, drop, and position different UI components 106 for use in, with, or by application 104. In an embodiment, template 112 may include a pre-configured connection to a data source 114, which may be accessed via metadata 116. Template 112 may be design and technology agnostic, such that even if the underlying data source 114 changes, the application development process described herein, as provided via IDMS 102, would remain unchanged to an admin 108 or user 110. This may allow for more efficient application creation and modification as the users 108, 110 may focus on the application development process.

Data source 114 may be a structure such as a disk-based or in-memory database spread across one or more computing devices with data that is accessible to application 104. In an embodiment, the data of data source 114 may include data of an organization such as sales, customer, employee, business relationship, financial, or other data. Data source 114 may be any database (including row or column based databases) or other storage structures that may be used to store and provide data for use by one or more applications 104.

Data source 114 may be indirectly accessed or processed applications 104 via metadata 116. In an embodiment, data source 114 may be pre-processed, which may include generating metadata 116 describing the structure and/or characteristics of data of data source 114. Metadata 116 may include information about data of data source 114. Metadata 116 may include the names and relationships between different tables and data, access privileges (e.g., such as for different users 110 or roles 126), data types, storage location, or other information about data.

Through providing access to data source 114 via metadata 116, IDMS 102 may provide a level of abstraction that may enable changes to the underlying data source 114 without requiring changes to application 104 that is built off of template 112 that relies on metadata 116. This may provide for greater usability and flexibility of applications 104 and templates 12 across different or multiple data sources 114. For example, the same application 104 may be used in different systems with different data sources 114. Conversely, changes to the structure or organization of data of data source 114, as indicated by metadata 116 may be immediately reflected to any users 110 accessing application 104. Furthermore, with multiple applications 104 designed and/or operating via IDMS 102 all accessing data source 114 via a uniform set of metadata 116, fewer computing resources may be consumed and application processing and responsiveness may be increased as data source 114 may not need to be independently processed for each application 104.

UI component 106 may include any visual indicator, display item, or other user interface component that may be displayed or executed during an operation or run-time of application 104. UI components 106 may include text, pictures, graphs, charts, real-time or periodically updated indicators, or any other GUI component that may or may not be generated based on data of data source 114. In an embodiment, IDMS 102 may provide different standard or commonly used UI components 106, or UI component may be the result of performing an action 120 on or with respect to specified data 118. Another example UI component 106 may include text boxes, or forms in application 104 may request text or information from a user 110, and/or present data or calculations to the user 110 (which may or may not be based on the received data and/or previously stored data of data source 114).

A UI component 106 may include different customizable or modifiable features such as data 118, action 120, and style 122. Data 118 may include an indication, specification, and/or selection data of data source 114. In an embodiment, data 118 may indicate which metadata 116 should be processed by action 120 or UI component 106. In an embodiment, UI component 106A may be a form that requests a user name, and data 118 may indicate (via metadata 116) how or where the received name data is stored (e.g., which table, database, row, etc. of data source 114). Or, for example, UI component 106A may be a chart of sales over time, then data 118 may indicate which rows, columns, or tables of data from data source 114 are used to populate the chart.

Action 120 may include an action or function that is performed by UI component 106 with respect to data 118 or in response to a user request or action. Action 120 may include sorting, charting, displaying, storing, modifying, deleting, combining, transmitting, moving, or performing any other action or set of actions with respect to retrieved or received data 118, or any combination thereof. Action 120 may include launching the functionality of or another application 104. Action 120 may include a visual or audible alert or event notification. For example, a particular graphic, text, or UI component 106 may only become visible or visibility may be increased upon the detection of a particular identified event (e.g., such as a change in a data value). In an embodiment, UI component 106A may include a button or other selectable item, in response to which UI component 106A may perform (or request to be performed) a designated or selected action 120.

In an embodiment, template 112 may include a number of standard or often-used actions from which admin 108 may select. For example, IDMS 102 may receive a selection of a storage action 120 and may request that admin 108 designate where the storage action is to take place with respect to data source 114 (i.e., data 118).

Style 122 may include any visual or audible effects associated with a UI component 106. Style 122 may include size, location/placement relative to other UI components, color or color palette, text, or audible sounds associated with a performance or execution of application 104 and particularly UI component 106.

In an embodiment, application 104 may include one or more custom components 124. Custom component 124 may include any custom functionality or action 120 that admin 108 may want to include in the operation of UI component 106 or application 104. For example, though particular UI components 106 may be pre-configured with common or standardized actions 120, IDMS 102 may provide the flexibility to override, add, modify, or remove any of the standard functionality through the use of one or more custom components 124. Example custom component 124 features may include adaptations of UI components 106 for different devices or screen sizes (which in another embodiment, may be a pre-configured template 112 feature), error and exception handling, and caching behavior.

In an embodiment, custom component 124 may include code that may be executed in lieu of or in addition to action 120. Additionally or in another embodiment, custom component 124 may include an entire application 104 that is designed without the use of any template 112 or standardized UI components 106, but which may still access data source 114 via metadata 116.

Role 126 may be an indication as to which users 110 are authorized to access which features and UI components 106 (including data 118, action 120, and style 122) of application 104. For example, two different users 110 in two different roles within an organization may see different versions of the same time entry application 104. For example, a first manager user 110 may see UI components 106 that allow the manager to enter their own time and also see the time entries of other employees. However, a non-managerial user 110 may only see the UI component 106 that enables time entry for that particular user.

In an embodiment, role 126 may indicate which users 110 may modify which UI components 106 or features thereof of application 104 (e.g., during run-time). Role 126 may also indicate whether those changes are one-time only, stored and persisted over time, and/or are reflected in the operation or execution of application 104 by one or more other users 104. For example, a manager user 110 may be able to make modifications 130 that are reflected in the execution of application 104 of one or more other team member users 110. Meanwhile, the team member users 110 may not have authority to make modifications 130 to application 104, or may only have authority to make modifications 130 for their own view or interaction with application 104.

Figure 5:
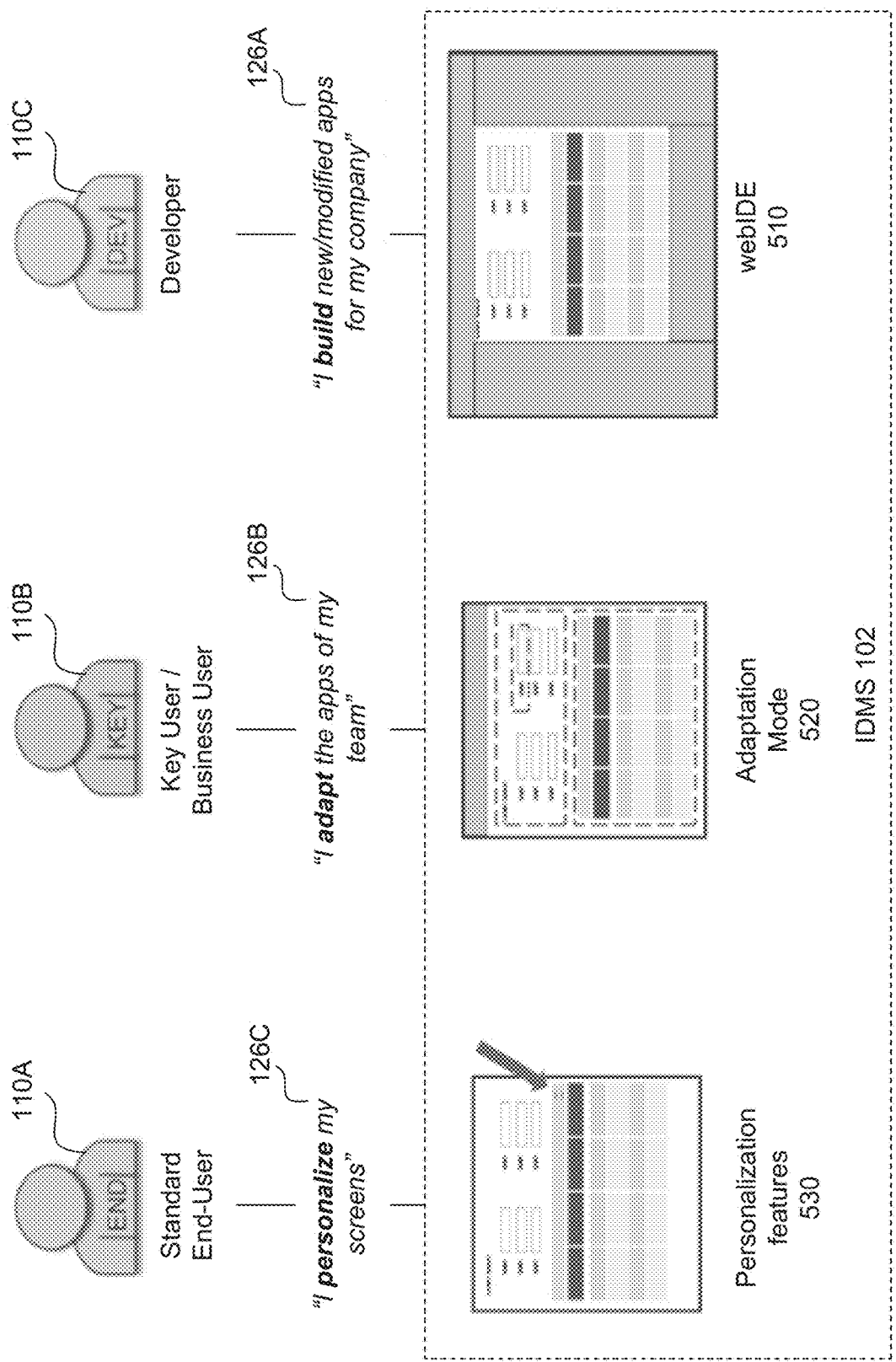
FIG. 5 is block diagram showing different user roles, according to some embodiments.

FIG. 5 is block diagram 500 showing different user roles 126, according to some embodiments. Three user roles 126A, 126B, and 126C are shown in the example of FIG. 5, although this disclosure is not limited to that example embodiment. The first is a developer or admin 110C, the second is a key user or business user 110B, and the third is a standard or end-user 110A. Other roles may include combinations or subsets of these roles 126A, 126B, 126C.

As noted by role 126A, developer 108 may build a new or modified application 104 for a company. In an embodiment, the creation of new applications may be limited to application developers 108. In an embodiment, different application developers 108 may have the authority (as indicated by role 126) to develop applications for particular business areas and/or sets of users 110. Developer 108 may create/modify application 104 using a webIDE (web integrated development environment) 510 during a design time. In using webIDE 510, developer 108 may modify any features associated with application 104, including metadata 116, data sources 114, custom components 124, roles 126, data 118, action 120, style 122, template 112, and the inclusion/removal of different UI components 106.

A key or business user 110B may adapt or modify the applications 104 for a team or other users as indicated by role 126B. For example, during a run-time of application 104, key user 110B may select an option to enter an adaptation mode 520 of IDMS 102. While operating in adaptation mode 520 (e.g., during run-time), key user 110B may make changes or modifications 130 to application 104, and select which other users 110 (if any) of a team or collection of people will see the modification 130. For example, a business manager 110B may make changes for a corresponding business group of users 110.

A standard or end-user 110A may personalize their own screen or UI components 106 as indicated by role 126C. The modifications 130 made by end-user 110A during a personalization phase (during run-time) of IDMS 102 may only be visible to end-user 110A, which may include personalization features 530. In an embodiment, end user 110A may have restrictions on which customizations or changes may be made relative to key user 110B. For example, there may be required business group functionality that end user 110A may not modify, but key user 110B may modify.

Returning to FIG. 1, modification 130 may include a run-time modification or change made by user 110 interacting with an executing or run-time version of application 104. In an embodiment, one or more portions of application 104 (e.g., such as changed made during design time) may be compiled prior to execution by IDMS 102. Then, different instances of application 104 may be executed or run on or across a number of mobile devices 134.

In an embodiment, modification 130 may include a change to UI components 106 or application 104 that does not need to be compiled or does not require a recompilation of application 104 to be implemented. In this manner, IDMS 102 may save resources and increase processing speed and capabilities by allowing for non-compilable changes or modifications 130 to application 104 on a user-by-user basis. Otherwise, for example, each change may need to be performed by a system administrator, who may have to recompile multiple different versions of an application, which would consume more memory and resources than simply storing modification 130 to a base or previously compiled version of application 104.

Mobile device 134 may be any device communicatively coupled to IDMS 102 or one or more servers that may include application 104. Mobile device 134 may be a cell phone, laptop, tablet, desktop computer, appliance and/or any other device, module, application or apparatus that communicates with IDMS 102 over a network. Mobile device 134 may access or launch an instance of application 104 as it is being executed across one more servers, such as over the cloud.

In an embodiment, using mobile device 134, user 110 may access and use application 104 as designed by admin 108 during design time. However, under role 126, user 110 may also modify one or more run-time components or features of application 104, including UI components 106A, 106B using mobile device 134. These run-time modifications 130 may then be applied by a runtime processor 132 to only the current instance of application 104 for user 110, and for an extended period of time each time user 110 may use application 104, or may be propagated to one or more other users 110 (not shown) who may access or be using application 104.

In an embodiment, modification 130 may be limited to any modifications to UI components 106 that may be performed using a touchscreen device, such as a tablet computer. For example, modification 130 may be a modification or change that may be implemented or requested using a drag-and-drop command or a button click or menu selection.

Modification 130 may include a modification to data 118, action 120, or style 122. For example, modification 130 may include changing the size/position (i.e., style 122) of a UI component 106, changing which data 118 is used to populate a UI component 106, or changing how that data is processed (i.e., action 120) such as presenting a pie chart instead of a bar chart, or using a key performance indicator instead of what was previously used. Or, for example, modification 130 may be an on/off, enable/disable toggle for various features 118, 120, 122 (which may be designated during design time) or particular UI components 106. In an embodiment, modification 130 may be a change to any feature that does not require a recompilation of application 104, in whole or in part. Or, for example, modification 130 may be a change to anything other than custom component 124 or metadata 116.

Runtime processor 132 may store and/or implement modification 130 on particular instances of application 104. For example, as noted above, modification 130 may be propagated to one or more additional users (such as team members of user 110) who may be authorized to access application 104 or for whom user 110 is authorized to change the functionality of application 104. These changes via modification 104 may propagated in real-time, the users may be notified that a modification 104 has been made and requested to restart application 104, or the modification 104 may be implemented on the next user login. Runtime processor 132 may be able to store and implement various versions of application 104 based on the individual and/or group modifications 130 received from one or more users 110.

In an embodiment, further design time changes or upgrades implemented by admin 108 may or may not reset or override modification 130. For example, if admin 108 makes a universal upgrade to application 104, then those changes may be implemented, however, individual modifications 130 may still be applied on top of those changes for particular users 110. Or, for example, after an upgrade, user 110 may be notified of the upgrade and may be asked whether or not the previous modifications 130 are to continue to be persisted.

Figure 2:
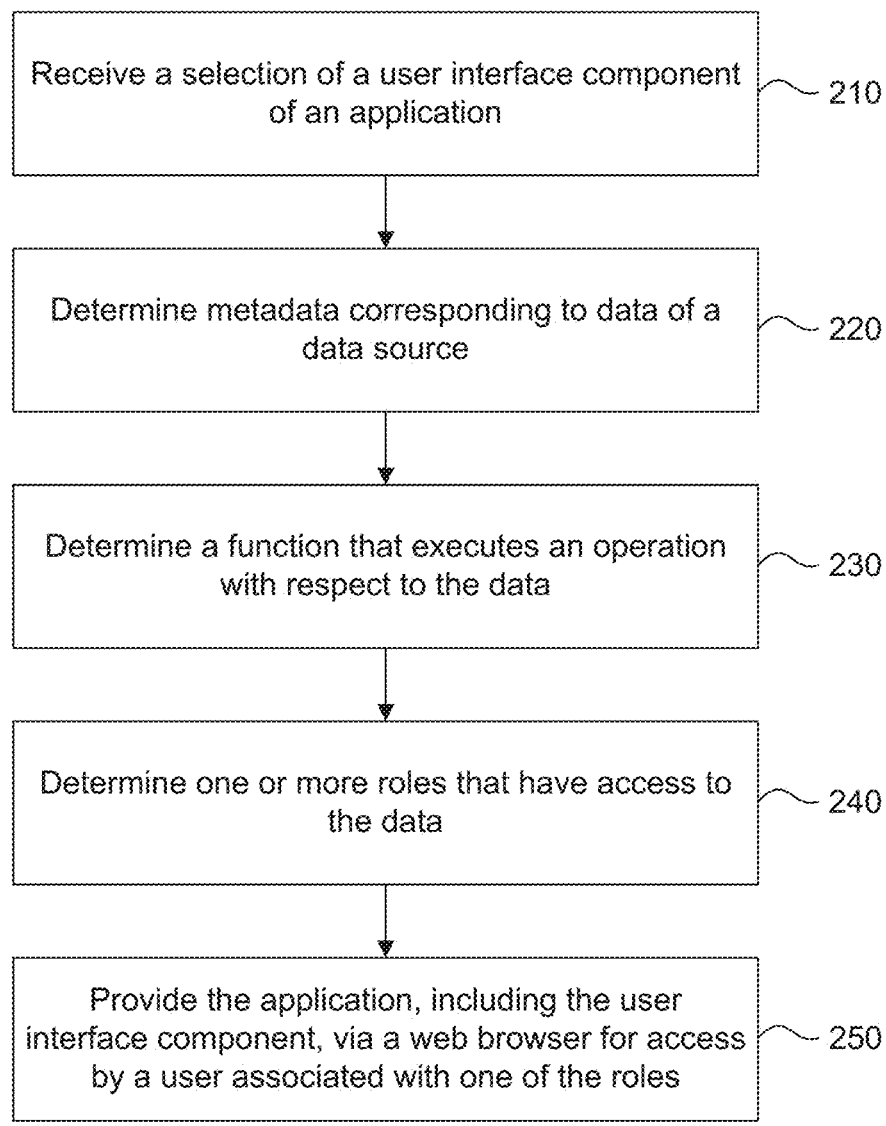
FIG. 2 is a flowchart for a design time method for an integrated development and modification system (IDMS), according to some embodiments.

FIG. 2 is a flowchart for a design time method 200 for an integrated development and modification system (IDMS), according to an embodiment. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

At 210, a selection of a user interface component of an application is received. For example, during a design-time process of IDMS 102, IDMS 102 may receive a component selection of a UI component 106 from admin 108. In an embodiment, IDMS 102 may provide a drag-and-drop interface from which admin 108 may select, drag, and drop UI component 106 onto a canvas or digital template 112.

At 220, metadata corresponding to data of a data source is determined. For example, IDMS 102 may receive a selection of data source 114, or portions thereof, from admin 108. In an embodiment, UI component 106 may be preprocessed or pre-configured and metadata 116 linking UI component 106 to data source 114 may be available as a proxy for selection or manipulation of data from data source 114 within UI component 106.

At 230, a function that executes an operation with respect to the data associated with the data and corresponding to the user interface component is determined. For example, IDMS 102 may receive an indication of an action 120 to be performed on the selected data 118. The action 120 may include generated a display item associated with UI component, such as a graph, chart, or indicator of some kind. Action 120 may include modifying data of data source 114, or receiving or requesting data from a user 110 during run-time. Action 120 may include, for example, performing a calculation.

At 240, one or more roles that have access to the data are determined. For example, role 126 may indicate which users 110 or roles have access to application 104 or the various UI components 106A, 106B thereof and how far those user privileges extend. For example, particular users 110 (or users in specified roles) may perform run-time modifications 130 to application 104. Those modifications 130 may then be persisted over time (even beyond further changes by admin 108) and/or be pushed onto the run-time applications 104 of one or more other users 110. Other users 110 however may be restricted as being only end users unable to make changes on behalf or other users, and who may or may not be enabled to make changes on their own views of application 104.

At 250, the application, including the user interface component, is provided via a web browser for access by a user associated with one of the roles. For example, user 110 may request to access application 104 via a mobile device 134. IDMS 102 may receive the request and instantiate an instance of application 104 in accordance with the privileges specified by role 126 for the requesting user and/or device.

Figure 3:
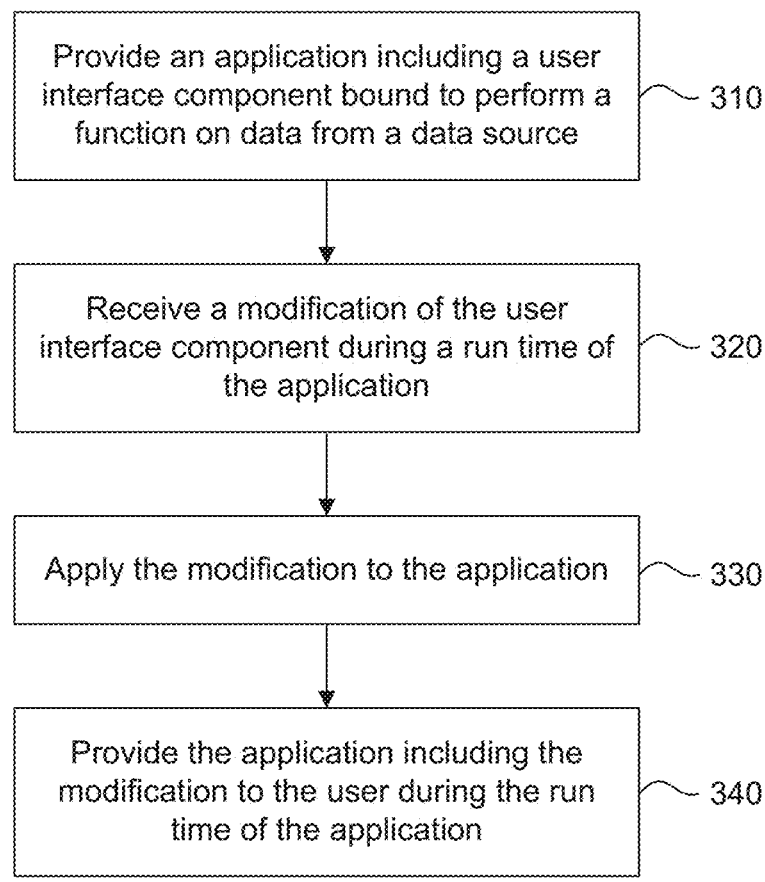
FIG. 3 is a flowchart for a run time method for an integrated development and modification system (IDMS), according to some embodiments.

FIG. 3 is a flowchart for a run time method 300 for an integrated development and modification system (IDMS), according to an embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

At 310, an application is provided, the application including a user interface component bound to perform a function on data from a data source. For example, a user 110 may access an application 104 developed on IDMS 102 during a design-time process, using a mobile device 134. The mobile device 134 may locally instantiate or request access to an instance of application 104 (e.g., which may be operating across one or more backend systems, such as in a cloud environment). Application 104 may include user interface components 106A and 106B which are configured to perform action 120 on data 118. Application 104 may use metadata 116 to retrieve, access, or modify data of data source 114.

At 320, a modification of the user interface component is received during a run-time of the application. For example, user 110 may modify application 104. The modification 130 may be retrieved during a run-time process of application 104 on mobile device 134. In an embodiment, during run-time, user 110 may toggle a modification activation feature in which the user 110 is enabled to modify features 118, 120, 122 of the UI components 106A, 106B.

At 330, the modification is applied to the application. For example, after a user has changed a UI component 106, the user may indicate that user 110 has completed the changes. The user 110 may toggle-off of the modification feature. IDMS 102 may then save the changes made by user 110 as modification 130. In an embodiment, modification 130 may be particular to an individual user, a group of users, and/or a particular device 134. For example, modification 130 may only apply when a user 110 is accessing application 104 from a cell phone, but may not apply when accessing application 104 from a laptop or different sized tablet.

At 340, the application including the modification is provided to the user during the run-time of the application. For example, each time user 110 instantiates application 104, runtime processor 132 may apply modification 130. Or, for example, upon receiving or storing modification 130, runtime processor 132 may push or propagate the modification 130 to one or more other users who may be access or be authorized to access application 104.

Figure 4:
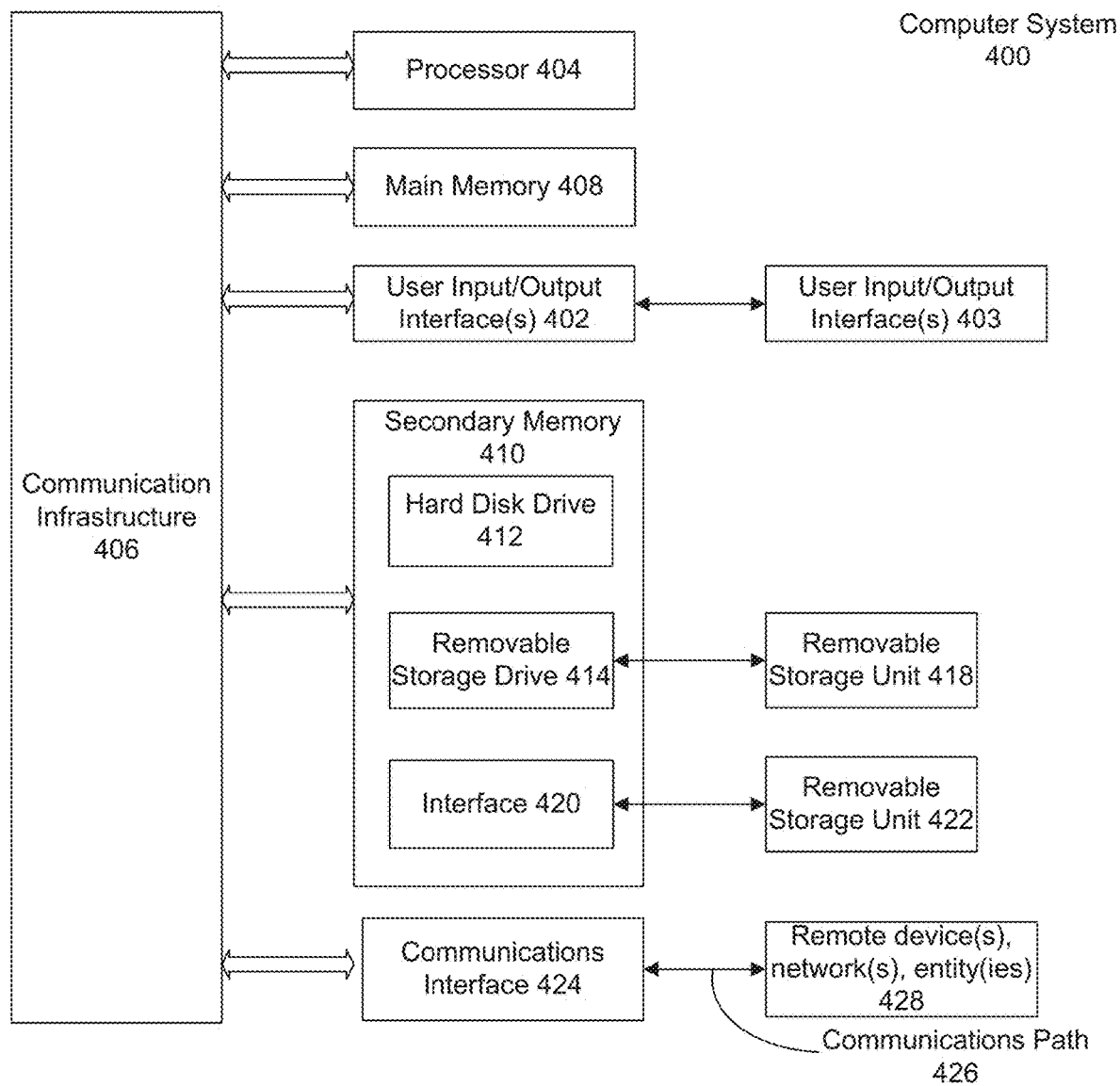
FIG. 4 is an example computer system useful for implementing various embodiments.

Various embodiments can be implemented, for example, using one or more computer systems, such as computer system 400 shown in FIG. 4. Computer system 400 can be used, for example, to implement the application 104 of FIG. 1 and/or the methods of FIGS. 2 and 3. Computer system 400 can be any computer capable of performing the functions described herein.

Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   displaying a user interface component bound to perform a function on data from a data source during a run-time execution of an application, wherein the function executes an operation with respect to the data based on metadata corresponding to the data source, wherein the application comprises a preconfigured connection to the data source that is accessible via the metadata corresponding to data of the data source, and wherein the user interface component is configured to display at least a portion of data of the data source retrieved through the preconfigured connection;
   receiving a request from a first user of a first run-time instance of the application to enter an adaption mode, wherein the adaption mode enables the first user to modify the user interface component of the application on the first run-time instance;
   receiving, from the first user, a modification to the user interface component of the application on the first run-time instance during the adaptation mode, wherein a second run-time instance of the application does not include the modification to the user interface component, wherein the second run-time instance is associated with a second user;
   receiving, from a developer, a modification of the structure of the data source, as indicated by the metadata;
   updating the application including the modification to the structure of the data source; and
   propagating the updated application including the modification to the structure of the data source, as received from the developer, to both the first run-time instance and the second run-time instance, wherein the propagating comprises providing a notification to the first user of the first run-time instance requesting input whether the modification to the user interface component is to remain displayed after the updating.

2. The method of claim 1, further comprising:
   storing the modification to the user interface component;
   performing a software update on the application, wherein the software update comprises modifying one or more portions of code of the application not associated with the modification to the user interface component; and
   providing the updated application including the stored modification.

3. The method of claim 1, wherein the modification to the user interface component comprises toggling a feature of the user interface component between being enabled or disabled.

4. The method of claim 1, wherein the modification to the user interface component is performed via a drag-and-drop command.

5. The method of claim 4, wherein the drag-and-drop command is received via a touchscreen tablet device.

6. The method of claim 1, wherein the modification to the user interface component changes a style of how the data is displayed in the user interface component.

7. The method of claim 1, wherein the modification to the user interface component is performed by a first role that is authorized to make changes to a user interface of one or more other users of the application.

8. The method of claim 1, further comprising: applying the modification to the user interface component to the application, wherein the modification to the user interface component is saved for an instance of the application and is immediately available for the first user device during the run-time execution of the instance of the application, and wherein the modification to the user interface component is available during a subsequent access of the application without recompiling the application.

9. The method of claim 1, wherein the metadata includes names and relationships between different tables and data, and access privileges for different users, including both the first user and a third user, wherein the first user is a key user relative to the third user, wherein the key user is authorized to modify a user interface of the third user.

10. The method of claim 9, wherein the propagating comprises:
propagating the modification to the user interface component to the third user, wherein subsequent to the propagating the updated application, the user interface of the third user includes the modification to the user interface component as received from the first user.

11. The method of claim 10, wherein the propagating comprises:
propagating metadata corresponding to the modification of the user interface component to a run-time instance associated with the third user.

12. A system, comprising:
a memory; and
at least one processor coupled to the memory and configured to:
display a user interface component bound to perform a function on data from a data source during a run-time execution of an application, wherein the function executes an operation with respect to the data based on metadata corresponding to the data source, wherein the application comprises a preconfigured connection to the data source that is accessible via the metadata corresponding to data of the data source, and wherein the user interface component is configured to display at least a portion of data of the data source retrieved through the preconfigured connection;
receive a request from a first user of a first run-time instance of the application to enter an adaption mode, wherein the adaption mode enables the first user to modify the user interface component of the application on the first run-time instance;
receive, from the first user, a modification to the user interface component of the application on the first run-time instance during the adaptation mode, wherein a second run-time instance of the application does not include the modification to the user interface component, wherein the second run-time instance is associated with a second user;
receive, from a developer, a modification of the structure of the data source, as indicated by the metadata;
update the application including the modification to the structure of the data source; and
propagate the updated application including the modification to the structure of the data source, as received from the developer, to both the first run-time instance and the second run-time instance, wherein the propagating comprises providing a notification to the first user of the first run-time instance requesting input whether the modification to the user interface component is to remain displayed after the updating.

13. The system of claim 12, wherein the at least one processor is further configured to: store the modification to the user interface component;
perform a software update on the application, wherein the software update comprises modifying one or more portions of code of the application not associated with the modification to the user interface component; and
provide the updated application including the stored modification.

14. The system of claim 12, wherein the modification to the user interface component comprises toggling a feature of the user interface component between being enabled or disabled.

15. The system of claim 12, wherein the modification to the user interface component is performed via a drag-and-drop command.

16. The system of claim 12, wherein the modification to the user interface component changes a style of how the data is displayed in the user interface component.

17. A non-transitory computer-readable device having instructions stored thereon that, when executed by at least one computing device, causes the at least one computing device to perform operations comprising:
displaying a user interface component bound to perform a function on data from a data source during a run-time execution of an application, wherein the function executes an operation with respect to the data based on metadata corresponding to the data source, wherein the application comprises a preconfigured connection to the data source that is accessible via the metadata corresponding to data of the data source, and wherein the user interface component is configured to display at least a portion of data of the data source retrieved through the preconfigured connection;
receiving a request from a first user of a first run-time instance of the application to enter an adaption mode, wherein the adaption mode enables the first user to modify the user interlace component of the application on the first run-time instance;
receiving, from the first user, a modification to the user interface component of the application on the first run-time instance during the adaptation mode, wherein a second run-time instance of the application does not include the modification to the user interface component, wherein the second run-time instance is associated with a second user;
receiving, from a developer, a modification of the structure of the data source, as indicated by the metadata;
updating the application including the modification to the structure of the data source; and
propagating the updated application including the modification to the structure of the data source, as received from the developer, to both the first run-time instance and the second run-time instance, wherein the propagating comprises providing a notification to the first user of the first run-time instance requesting input whether the modification to the user interface component is to remain displayed after the updating.

18. The device of claim 17, wherein the at least one computing device is further configured to perform operations comprising:

storing the modification to the user interface component;
performing a software update on the application, wherein the software update comprises modifying one or more portions of code of the application not associated with the modification to the user interface component; and
providing the updated application including the stored modification.

19. The device of claim 17, wherein the modification to the user interface component comprises toggling a feature of the user interface component between being enabled or disabled.

20. The device of claim 17, wherein the modification to the user interface component changes a style of how the data is displayed in the user interface component.

* * * * *